April 27, 1926.
L. V. PENCE
UTENSIL FOR MAKING DRIP COFFEE
Filed Dec. 15, 1924
1,582,685
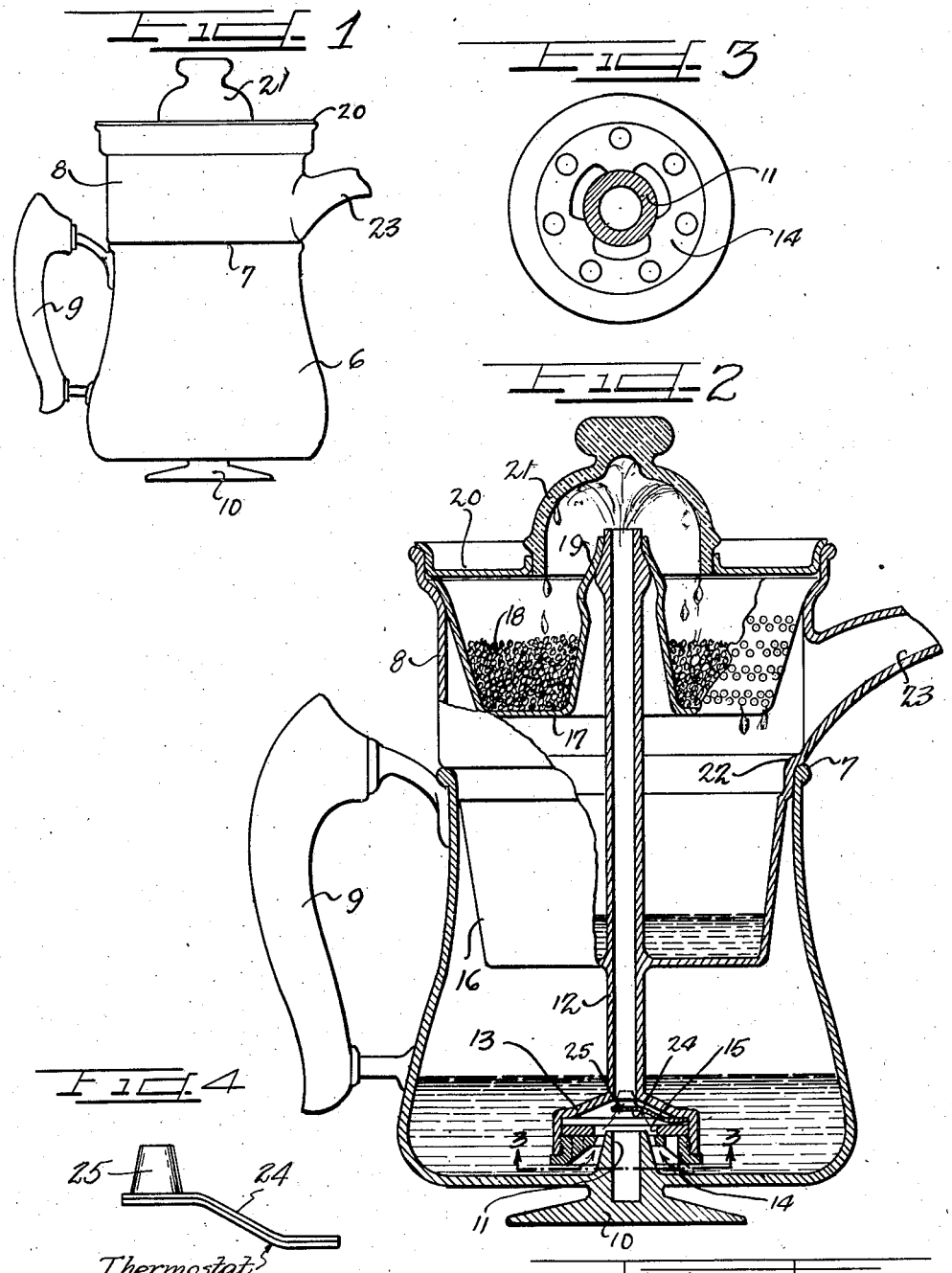

Patented Apr. 27, 1926.

1,582,685

UNITED STATES PATENT OFFICE.

LAFE V. PENCE, OF EL PASO, TEXAS.

UTENSIL FOR MAKING DRIP COFFEE.

Application filed December 15, 1924. Serial No. 755,853.

*To all whom it may concern:*

Be it known that I, LAFE V. PENCE, a citizen of the United States, and a resident of the city of El Paso, in the county of El Paso and State of Texas, have invented certain new and useful Improvements in a Utensil for Making Drip Coffee; and I hereby declare that the following is a full, clear, and exact description of the same, reference being had to the accompanying drawings, and to the numerals of reference marked thereon, which form a part of this specification.

This invention relates to an improved coffee pot adapted to make drip coffee.

It is an object of this invention to make drip coffee in a single operation by providing a primary source of boiling water with a percolator elevating the water above the coffee grounds for a single passage therethrough, the drippage being prevented from returning to the primary water supply as has been heretofore necessary with percolator coffee pots. Heretofore to obtain drip coffee it has been necessary to separately heat the water and then pour it into the drip chamber and wait for it to seep through the coffee grounds. With percolator coffee pots, the seepage from the coffee grounds returns to the water below and is diluted thereby as well as boiled. This results in a continuous recirculation through the coffee grounds that results in variable strength of the brew and in a bitter taste due to the boiling of the brew in the water chamber. With my new process, true drip coffee without boiling of the brew is obtained with the convenience of the percolator method, by the elimination of the necessity of the separate operation of heating the water supply, and a portion of the full strength of the brew may be drawn off at any time without affecting the operation of the pot for the remaining brewing operation.

It is also an object of this invention to provide a thermostatic control for the percolator mechanism whereby the entire body of water, and necessarily the pot, is brought up close to the boiling temperature before the percolator action is permitted to commence. It is well known that the percolator action ordinarily starts before the entire body of water is really hot and the first part of the discharge is therefore likely to be chilled and therefore incapable of extracting the real flavor of the coffee grounds.

Other and further important objects of this invention will be apparent from the disclosures in the specification and the accompanying drawings.

This invention (in a preferred form) is illustrated in the drawings and hereinafter more fully described.

On the drawings:

Figure 1 is a side view of a complete coffee pot embodying features of this invention.

Figure 2 is an enlarged central section thereof.

Figure 3 is a section on the line 3—3 of Figure 2.

Figure 4 is an enlarged detailed side elevation of the thermostatically controlled valve.

As shown on the drawings:

A water heating vessel is provided by a base section 6 having a circular top opening 7 to receive a coffee container section 8. The base section is provided with a handle 9 on one side and a heat collecting stand or boss 10 centrally of the bottom, an annular extension 11 of the stand projecting into the interior of the vessel to form a steam generating compartment and a centering boss for the percolator pipe 12; which is provided with an inverted cup 13 containing an apertured centering member 14 with a loose washer 15 thereabove adapted to be lifted by the inflow of water into the cup and to drop against the centering member 14 to direct the force of the generated steam and entrained water up the percolator pipe by largely preventing backflow into the vessel 6.

The coffee container section is formed about or soldered to the percolator tube to form a receptacle 16 for the coffee liquor dripping from the perforated pan 17 holding the coffee grounds 18. This pan is inserted in the top of the container section and has a central boss 19 through which the top of the percolator tube projects. The top of the container 8 is closed by a cover 20 having the usual glass dome 21 inserted therein against which the percolator spray impinges. The container 8 is provided with a shoulder 22 at the proper height to engage the rim 7 of the lower vessel to properly position the percolator cup therein. A spout 23 may be formed in the material of the container 8 so that a portion of the contents may be poured off prior to completion of the entire batch.

A thermostatic control of the percolator action may be provided if desired, to secure uniform heating of the water supply and coffee pot so that the first few drops percolated will not be unduly chilled during passage to and through the coffee and into the empty container. Such a control may be provided for example by utilizing a bimetal strip thermostat 24 to control a plug 25, closing the opening of the percolator tube until the temperature of the coffee pot and contents reaches the desired figure, causing the thermostatic strip to bend downwardly to withdraw the plug.

In use a desired quantity of water is placed in the lower vessel after enough additional water to initially cover the central annular extension is added. This excess water is necessary because percolation practically stops when the boss is uncovered. The excess also serves as a water and steam jacket for the coffee in the upper container, retaining the heat much longer. The action of the percolator proper is well known, the water flowing into the tube 12 until equilibrium is attained, and the heat supply concentrated about the annular extension generated steam which blows the water in the tube up against the glass dome from which it drains onto the coffee pan, the drippage from which collects in the upper vessel.

It will thus be seen that I have obtained the simplicity of a percolator system with the superior aroma and flavor obtainable with a drip coffee set without the complications ordinarily involved in the later system.

I am aware that many changes may be made, and numerous details of construction may be varied through a wide range without departing from the principles of this invention, and I therefore do not purpose limiting the patent granted hereon otherwise than necessitated by the prior art.

I claim as my invention:

1. In a coffee pot, a lower vessel for water, a container inserted therein, a coffee receptacle, means automatically delivering the water from said vessel to said coffee receptacle, and a thermostatic valve associated with said delivery means, said valve being constructed to be controlled by the temperature of the body of water, whereby to prevent the delivery of water until a predetermined temperature is attained.

2. A coffee pot, comprising a water vessel, a coffee container, a perforated coffee pan, means automatically passing boiling water from said vessel to and through said pan to said container, and a thermostatic valve responsive to the water temperature and adapted to prevent the delivery of water by said means until a predetermined temperature is attained.

3. In combination with a coffee percolator, a thermostatic valve controlled by the body of the liquid in the percolator and constructed to prevent the percolator action until the body of water attains a predetermined temperature.

In testimony whereof I have hereunto subscribed my name.

LAFE V. PENCE.